J. FORSTER.
FLOWER POT.
APPLICATION FILED MAR. 14, 1917.
1,317,569.
Patented Sept. 30, 1919.
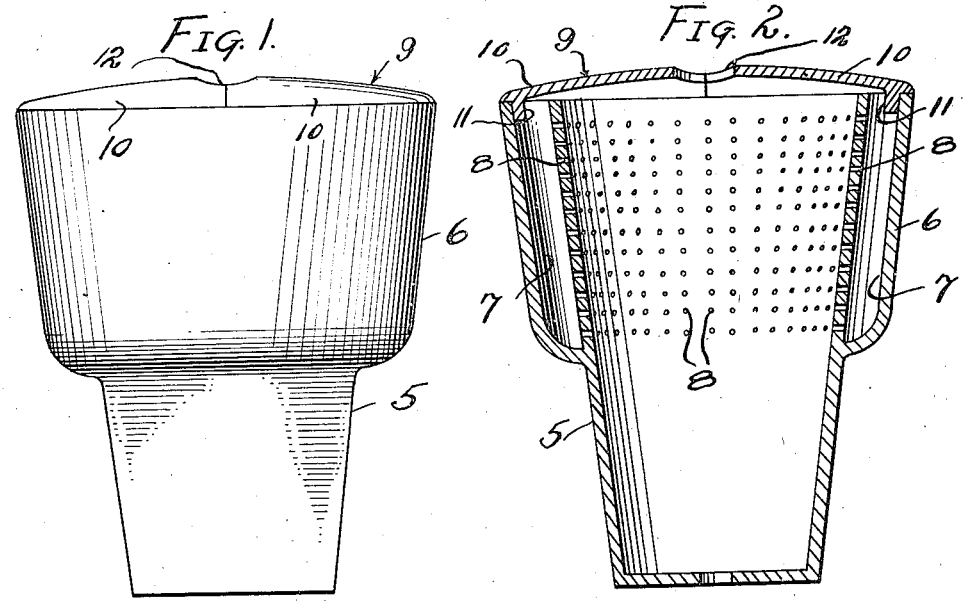
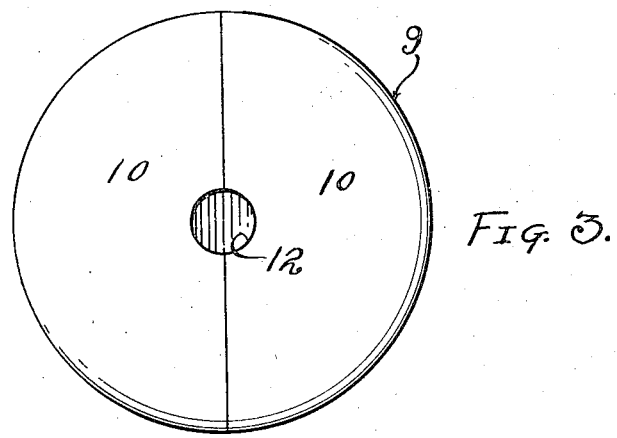
Inventor
J. Forster.

ated Sept. 30, 1919.
UNITED STATES PATENT OFFICE.

JOSEPH FORSTER, OF PATCHOGUE, NEW YORK.

FLOWER-POT.

1,317,569. Specification of Letters Patent. Patented Sept. 30, 1919.

Application filed March 14, 1917. Serial No. 154,755.

*To all whom it may concern:*

Be it known that I, JOSEPH FORSTER, a citizen of the United States, residing at Patchogue, in the county of Suffolk, State of New York, have invented certain new and useful Improvements in Flower-Pots; and I do hereby declare the following to be a full, clear, and exact description of the invention, such as will enable others skilled in the art to which it appertains to make and use the same.

This invention relates to improvements in flower pots, and has for an object to provide an article of this character embodying means of novel construction and arrangement for supplying water to the earth and plant contained therein in such quantity as to approximately balance its removal by evaporation and plant demand, so that one filling of water will suffice for a relatively long period.

With the above and other objects of similar nature in view, the invention consists in the construction, combination and arrangement of parts, set forth in and falling within the scope of the appended claim.

In the drawing:—

Figure 1 is a side elevation of a flower pot constructed in accordance with the invention.

Fig. 2 is a vertical section therethrough; and

Fig. 3 is a top plan view.

Referring now more particularly to the accompanying drawing, the improved flower pot is preferably constructed of the usual terracotta, and consists of a body member 5 in the form of a receptacle of truncated cone shape as is common to flower pots of conventional type. The body member or receptacle 5 is adapted to contain the earth and plant, and has surrounding the upper portion of its wall and spaced therefrom, a second wall 6 resulting in a reservoir 7 adapted to receive and contain a supply of water. The outer wall 6 is preferably of such proportion as to extend from a plane coincident with the upper rim of the receptacle 5, downwardly for a distance approximately equal to half the height of said member, and joined thereto in any suitable manner, although it is, of course, understood that I do not wish to be limited in this particular.

In order to afford the earth and plant a gradual and continuous supply of water, the upper wall portion of the receptacle 5, or more specifically that portion surrounded by the wall 6 is provided with a plurality of minute perforations 8. These perforations 8 serve to establish communication between the receptacle 5 and reservoir 7, and permit of a gradual seepage of water into the former in a quantity to approximately balance its removal from the earth by evaporation and plant demand, the plant being in this manner properly sustained.

By this arrangement it is possible to provide a flower pot which need be refilled only at infrequent intervals, the reservoir 7 containing a supply of water sufficient for a relatively long period without replenishing.

There is further provided for the pot, a removable top 9 in the form of two semi-circular concaved sections 10, provided adjacent the arcuate edges with depending flanges 11 engaging the inner face of the wall 6 to retain the sections in applied position. The straight or contacting edges of the top are provided with registering semi-circular recesses producing an opening 12 through which the stem of the plant projects. The reason for halving the top 9 is to permit of its removal without disturbing the plant, when it is desired to fill the reservoir 7.

It will be noted that the cover extends inwardly over and beyond the upper edge of the body of the pot and in spaced relation thereto, the under face of the cover slanting upwardly toward the central opening. Moisture rising from the earth in the pot, will collect and be condensed against the under surface of the cover, along which it will pass and from the flange of which it will drip into the reservoir for return to the pot.

What I claim is:—

The combination with a flower pot having the upper part of its wall perforated and having a reservoir spaced from, concentric to and surrounding the perforated portion of the wall, of a cover removably disposed upon the upper edge of the reservoir and having a drip flange lying against the inner surface of the reservoir wall, the cover extending inwardly and upwardly beyond and in spaced relation to the upper edge of the wall of the pot and terminating short of and near to the continuation of the axis of the pot, whereby to collect and condense and direct to the reservoir, moisture that may arise from the earth within the pot.

In testimony whereof, I affix my signature, in the presence of two witnesses.

JOSEPH FORSTER.

Witnesses:
 JAMES M. JACKSON,
 HERBERT R. COOK.